United States Patent
Sung

(10) Patent No.: US 8,063,117 B2
(45) Date of Patent: Nov. 22, 2011

(54) ARTIFICIAL MARBLE AND PREPARATION PROCESS THEREOF

(75) Inventor: Min Chul Sung, Cheongju (KR)

(73) Assignee: LG Chem, Ltd. (KR)

( * ) Notice: Subject to any disclaimer, the term of this patent is extended or adjusted under 35 U.S.C. 154(b) by 17 days.

(21) Appl. No.: 12/522,595

(22) PCT Filed: Jan. 8, 2008

(86) PCT No.: PCT/KR2008/000089
§ 371 (c)(1),
(2), (4) Date: Jul. 9, 2009

(87) PCT Pub. No.: WO2008/084948
PCT Pub. Date: Jul. 17, 2008

(65) Prior Publication Data
US 2010/0029839 A1    Feb. 4, 2010

(30) Foreign Application Priority Data
Jan. 9, 2007 (KR) .................. 10-2007-0002430

(51) Int. Cl.
*C09D 5/29* (2006.01)

(52) U.S. Cl. ...................................................... 523/171
(58) Field of Classification Search .................. 523/171
See application file for complete search history.

(56) References Cited

FOREIGN PATENT DOCUMENTS

| JP | 06-183807 | 7/1994 |
|---|---|---|
| JP | 2000-158457 | 6/2000 |
| KR | 10-2000-0073530 | 12/2000 |
| KR | 10-0605090 | 7/2006 |

OTHER PUBLICATIONS

International Search Report—PCT/KR2008/000089 dated Apr. 8, 2008.
Written Opinion—PCT/KR2008/000089 dated Apr. 8, 2008.

*Primary Examiner* — Edward Cain
(74) *Attorney, Agent, or Firm* — Cantor Colburn LLP

(57) ABSTRACT

The present invention relates to an artificial marble comprising a base resin part; and a pearl stripe part which contains a matrix resin and pearls, and expresses stripes on said base resin part by the contained pearls and a process for preparing the same. The present invention may provide an artificial marble, which can embody higher grade appearance effects by concentrating pearl into the parts expressing stripes of the artificial marble and freely regulating color, quality of pearl and/or patterns of stripes, and a process for preparing the same.

11 Claims, No Drawings

ARTIFICIAL MARBLE AND PREPARATION PROCESS THEREOF

TECHNICAL FIELD

The present invention relates to an artificial marble having the texture close to native rocks by giving advanced sparkling effect through pearls and a process for preparing the same.

BACKGROUND ART

An artificial marble is an artificially synthesized material embodying the texture of native rock by combining additives such as natural stone dusts, minerals and/or resin chips with a cement base or a resin base such as an acrylic resin, an unsaturated polyester resin and/or an epoxy resin.

The artificial marbles may be roughly divided into single colored products (solid products) and products (granite products) comprising chips and the like. Representative examples of the artificial marbles include acrylic artificial marbles, polyester artificial marbles, epoxy artificial marbles, melamine artificial marbles or engineered stone (E-stone) type artificial marbles and the like. Such artificial marbles have a beautiful appearance and an excellent workability, are lighter than natural marbles and have an excellent strength. Therefore such artificial marbles are widely used as various interior/exterior materials such as various upper board materials, dressing tables, washstands, counters, wall materials, floors and furniture.

Now, in order to embody closer patterns to natural rock or new patterns not known yet in the artificial marble, there is an attempt to form stripe patterns on the artificial marbles, or give variety to a size, a color or a quality of the chips contained in the artificial marbles. However, the above technique has limit to form excellent patterns, since there are concerns that it makes a monotonous impression. In addition, as an alternative process, there is a method of imitating patterns such as BIANCO in a way that patterns are directly painted in products. However, in this way, it is also difficult to freely regulate patterns and there is a drawback that reproducibility is lowered.

DISCLOSURE OF INVENTION

Technical Problem

The present invention has been accomplished in consideration of the aforementioned problems of conventional art. The object of the present invention is to provide an artificial marble, which can embody high-grade appearance effects by concentrating pearls into parts embodying stripes of the artificial marble and freely regulating color or quality of pearl and/or patterns of stripes, and a process for preparing the same.

Technical Solution

The present invention provides, as a mean to solve the above problems, an artificial marble comprising a base resin part; and a pearl stripe part containing a matrix resin and pearls, and formed in said base resin part for expressing stripes in said base resin part by mean of said pearls contained therein.

In said artificial marble of the present invention, the base resin part may comprise one or more selected from the group consisting of an acrylic resin, an unsaturated polyester resin, an epoxy resin and a melamine resin.

Further, in said artificial marble, the pearl stripe part comprises preferably 1 to 10 parts by weight of pearl relative to 100 parts by weight of the matrix resin.

Further, in said artificial marble, the stripes expressed by the pearl stripe part have preferably a width of 10 mm or less.

The present invention provides, as an another mean to solve the above problems, a process for preparing an artificial marble which comprises a step of preparing a composition for the base resin part; a step of preparing a composition for the pearl stripe part; and a step of spraying said composition for the pearl stripe part into said composition for the base resin part by using a nozzle to prepare a composition for an artificial marble.

Following the above steps, the present process may further comprise a step of hardening the composition for an artificial marble; and a step of tailoring and sanding the hardened composition.

Further, it is preferred in said process that the composition for the base resin part has viscosity of 80 to 100 cps, and the composition for the pearl stripe part has viscosity of 60 to 80 cps.

Further, it is preferred in the process of the present invention that the composition for the base resin part has specific gravity of 1.4 to 2.0, and the composition for the pearl stripe part has specific gravity of 1.5 to 2.2.

Further, it is preferred in said process that the composition for the pearl stripe part is sprayed in an air pressure of 0.2 MPa to 0.6 MPa on forming stripes.

Advantageous Effects

The present invention may provide an artificial marble, which can embody high grade appearance effects by concentrating pearls into parts embodying stripes of the artificial marble and freely regulating color or quality of pearls and/or patterns of stripes, and a process for preparing the same.

BEST MODE FOR CARRYING OUT THE INVENTION

The present invention relates to an artificial marble comprising a base resin part; and a pearl stripe part containing a matrix resin and pearls, and formed in said base resin part for expressing stripes in said base resin part by mean of said pearls contained therein. The present invention may produce excellent appearance effects with even less pearls by concentrating pearls into the stripe part, and freely regulating width, gap and/or color of the stripes, compared to the prior art in which pearls is added to the whole artificial marble. Accordingly, the present invention may provide an artificial marble having excellent appearance effect by representing higher grade sparkling effects than the prior art.

Hereinafter, the artificial marble of the present invention is explained in detail.

Specific kinds of base resins, which may be used in the artificial marble of the present invention, are not particularly limited. That is, various base resins, which are used in preparing various artificial marbles known in this field, such as acrylic artificial marbles, polyester artificial marbles and epoxy artificial marbles, may be used without limitation.

Examples of such base resins which are usable herein may include one or more selected from the group consisting of an acrylic resin, an unsaturated polyester resin, an epoxy resin and melamine resin. The base resin part may be formed from the syrup consisting of the above resins, and the syrup comprises usually a monomer and a high molecular weight substance. An example of said high molecular weight substance may include an oligomer or a polymer, and the like.

Specific kinds of said acrylic resin are not particularly limited. For example, a polymer formed from one or more acrylic monomers selected from the group consisting of methyl(meth)acrylate, ethyl(meth)acrylate, butyl(meth)acrylate, 2-ethylhexyl(meth)acrylate, benzyl(meth)acrylate and glycidyl(meth)acrylate may be used. When the syrup for base resin part consists of such an acrylic monomer, said syrup may comprise the acrylic monomer as mentioned above alone or in a mixture of two or more species, and if appropriate, it may also comprise a mixture of the acrylic monomer and a polymer of said acrylic monomer. Preferably, said syrup comprises, but is not limited to, methyl methacrylate. In addition, it is preferred that a high molecular weight substance such as a polymer or an oligomer is included in an amount of 10 to 50 parts by weight in the resin syrup, but it is not limited thereto.

Kinds of said unsaturated polyester resins are also not particularly limited. For example, polyester resin which is prepared through a condensation reaction of a saturated and/or unsaturated dibasic acid with a polyhydric alcohol, and has an acid value of about 5 to 40 and a molecular weight ($M_w$) of about 1,000 to 5,000 may be used.

Examples of said dibasic acids may include maleic anhydride, citraconic acid, fumaric acid, itaconic acid, phthalic acid, phthalic anhydride, isophthalic acid, terephthalic acid, succinic acid, adipic acid, sebasic acid and/or tetrahydrophthalic acid, and the like; and examples of polyhydric alcohols may include ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane monoarylether, neopentyl glycol, 2,2,4-trimethyl-1,3-pentanediol and/or glycerine, and the like. In addition, when the base resin part consists of said polyester resin, a monobasic acid such as acrylic acid, propionic acid or benzoic acid; and/or polybasic acid such as trimellitic acid or tetracarboxylic acid of benzol can be further comprised.

In addition, kinds of usable epoxy resins above are also not particularly limited. For example, a bifunctional or multifunctional epoxy resin may be used. Examples of said bifunctional or multifunctional epoxy resins may include one or more selected from the group consisting of bisphenol A epoxy resin, bisphenol S epoxy resin, tetraphenyl ethane epoxy resin and phenol novolac epoxy resin.

In the present invention, said base resin part may also comprise one or more additives selected from the group consisting of a crosslinking agent, a polymerization initiator, an inorganic filler and chips.

The kinds of crosslinking agents which are usable in the present invention are not specifically limited. For example, multifunctional acrylic monomers, which include copolymerizable double bonds and are able to crosslink with the base resin, and the like, may be used. Examples of such multifunctional acrylic monomers may include one or more selected from the group consisting of ethylene glycol di(meth)acrylate, diethylene glycol di(meth)acrylate, triethylene glycol di(meth)acrylate, tetraethylene glycol di(meth)acrylate, 1,6-hexandiol di(meth)acrylate, polybutylene glycol di(meth)acrylate and neopentyl glycol di(meth)acrylate. Among these, ethylene glycol di(meth)acrylate is more preferred. It is preferred that said crosslinking agent is included in an amount of 0.1 to 10 parts by weight, relative to 100 parts by weight of the base resin. If said amount is less than 0.1 parts by weight, it is apprehended to cause problems such as generation of unevenness on surface of artificial marbles, generation of bubbles inside, lowering of bonding strength between raw materials, lowering of heat resistance and/or lowering of thermal discoloration resistance. In addition, if the amount of said crosslinking agent is in excess of 10 parts by weight, it is apprehended that chips in the artificial marble are phase-separated and thus, appearance patterns becomes deteriorated.

In addition, said polymerization initiator serves as a hardener to harden a composition on preparing an artificial marble and such an initiator may be used together with a polymerization accelerator. Kinds of such polymerization initiators are not particularly limited. Examples of such polymerization initiators may include organic peroxides. Specific examples of such polymerization initiators include diacyl peroxides such as benzoyl peroxide or dicumyl peroxide; hydroperoxides such as butyl hydroperoxide or cumyl hydroperoxide; t-butylperoxy maleic acid; t-butyl hydroperoxide; acetyl peroxide; lauroyl peroxide; azobisisobutyronitrile; azobisdimethylvaleronitrile; t-butylperoxy neodecanoate and/or t-amylperoxy 2-ethyl hexanoate, and the like. Polymerization and hardening herein may be carried out at room temperature by using a mixture of amine peroxide and sulfonic acid; or a mixture of peroxide and a cobalt compound. It is preferred that the amount of such polymerization initiator is 0.1 to 10 parts by weight relative to 100 parts by weight of the base resin. If said amount is less than 0.1 parts by weight, it is apprehended that the hardening rate is slowed or sufficient hardening is not carried out. If the amount is in excess of 10 parts by weight, it is apprehended that lowering of products property or crack is caused by rapid hardening.

In addition to said polymerization initiator, a radical carrier such as mercaptan compound (ex. n-dodecyl mercaptan, tertiary-dodecyl mercaptan, benzyl mercaptan and/or trimethylbenzyl mercaptan) may be also used herein on preparing the artificial marble. At this time, the amount of radical carrier is preferably 0.1 to 5 parts by weight relative to 100 parts by weight of the base resin, but is not limited to this.

Also, the base resin part constituting the artificial marble may further comprise inorganic fillers. Examples of usable inorganic fillers herein may include aluminum hydroxide, magnesium hydroxide and/or calcium aluminate, and the like. Said inorganic filler is included in an amount of 100 to 200 parts by weight relative to 100 parts by weight of the base resin, but is not limited to this. For purposes such as improvement of dispersibility of inorganic fillers, prevention of precipitation and/or improvement of mechanical strength of products, and the like, said inorganic filler may also be surface-treated with a silane coupling agent, a titanate coupling agent or stearic acid and the like.

Said base resin part may suitably comprise various chips such as resin chips, color chips and/or natural material chips, which are usually used in the field, in addition to each component as described above. Also, said base resin part may further comprise one or more additives selected from silicone and non-silicone type antifoaming agent; silane (for example, trimethoxy silane), acid or titanate type coupling agents; organic or inorganic pigments or dyes; phenyl salicylate, benzophenone, benzotriazole, nickel derivative or radical scavenger type ultraviolet absorbers; halogen, phosphorous or inorganic metal flame retardants; stearic acid or silicone type releasing agents; catechol or hydroquinone type polymerization inhibitors; and phenol, amine, quinone, sulfur and phosphorus antioxidants.

The present artificial marble is characterized by further comprising a pearl stripe part in addition to said base resin part. Said pearl stripe part comprises a matrix resin and pearls that are uniformly dispersed in said matrix resin. Said pearl stripe part serves to express pearl stripes on the surface of artificial marble by being included inside of artificial marble. Such a pearl stripe part may be prepared by preparing a composition for the pearl stripe part having different specific gravity and/or viscosity from the composition constituting said base resin part, followed by spraying the composition for the pearl stripe part into the composition for base resin part by means of nozzle, and the like in a specific air pressure and hardening it. The present invention may also embody various appearance effects in the artificial marble by giving variety to the colors of the pearls and combining various kinds of pearls included in the pearl stripe part. The pearl stripe part may comprise 1 to 10 parts by weight, more preferably 2 to 5 parts by weight, even more preferably about 3 parts by weight of pearls, relative to 100 parts by weight of the matrix resin. If said amount is less than 1 part by weight, it is apprehended that the effect of expressing stripes by pearls is not represented. If it is in excess of 10 parts by weight, it is apprehended that economic efficiency is lowered, viscosity is excessively increased, and crack is caused along the stripe after preparing the product.

The kinds of the matrix resin constituting said pearl stripe part are not particularly limited. For example, the same resin as ones constituting the base resin part as described above may be used. In addition to this, the pearl stripe part may further comprise one or more additives selected from the group consisting of crosslinking agents, polymerization initiators, inorganic fillers, chips, polymerization accelerators, radical carriers, antifoaming agents, coupling agents, pigments, dyes, ultraviolet absorbents, flame retardants, releasing agents, polymerization inhibitors and antioxidants, within the range without affecting the effect of invention. The person skilled in the field may easily select specific kinds and amounts of said additives and the like. For example, the same kinds and/or amounts of additives as those in case of the base resin part as described above may be used.

Said pearl stripe part is preferably included in an amount of not more than 20 parts by weight relative to 100 parts by weight of the base resin constituting the base resin part. Further, it is more preferable that said pearl stripe part is included in an amount of 10 to 20 parts by weight relative to 100 parts by weight of the base resin. If said amount is in excess of 20 parts by weight, it is apprehended that economic efficiency is lowered.

In the present artificial marble, a stripe expressed by said pearl stripe part has preferably a width of 10 mm or less. However, the above width is merely one aspect of the present invention. In the present invention, said width may be freely changed depending on the desired appearance effect to be embodied and/or use of the artificial marble. Further, said stripe may also have an irregular width and may be also formed in a shape of which such width is gradually increased or decreased. In addition, the stripe expressed by pearl stripe part in the present artificial marble may come partially in contact, or be partially overlapped with another adjacent stripe and be also formed in a shape of which one stripe is divided into several stripes. The person skilled in this field may freely control a width and/or a shape of said stripe by applying the present process as described below.

The present invention relates also to a process for preparing an artificial marble which comprises steps of
preparing a composition for base resin part;
preparing a composition for pearl stripe part; and
spraying the composition for said pearl stripe part into the composition for base resin part by using a nozzle to prepare a composition for artificial marble.

Also, following the above steps, the present process may further carry out a step of hardening the composition for artificial marble; and
a step of tailoring and sanding the hardened composition.
Hereinafter, the present process is explained in detail.

In the present process, a composition (a composition for base resin part) constituting the base resin part and a composition (a composition for pearl stripe part) constituting the pearl stripe part are first prepared. At this time, the order of preparing each composition may be freely selected without specific limitation. If desired, said steps may be carried out at the same time. Here, the methods for preparing the compositions are not specifically limited. For example, using each component as described above, they may be prepared by usual methods in this field.

Although being not particularly limited, it is preferred that the composition for base resin part has viscosity of 80 to 100 cps and the composition for pearl stripe part has viscosity of 60 to 80 cps. If the viscosity of said composition for base resin part is less than 80 cps, it is apprehended that the stripe is scattered. If it is more than 100 cps, it is apprehended that undesirable film is formed on the surface during molding process, or smooth flowing of raw material is hindered. Also, if the viscosity of said composition for pearl stripe part is less than 60 cps, it is apprehended that the stripe is leant to the upper direction. If it is more than 80 cps, it is apprehended that smooth flowing of raw material is hindered.

In addition, it is preferred in the present invention that said composition for base resin part has specific gravity of 1.4 to 2.0 and said composition for pearl stripe part has specific gravity of 1.5 to 2.2. However, it is not limited thereto.

In the present invention, the composition as above to be used as a raw material is prepared, and then the prepared composition for pearl stripe part is sprayed into the composition for base resin part by using a nozzle to form stripes. At this time, the method for spraying the composition for pearl stripe part is not particularly limited. For example, it is preferred to use a method for forming stripes by pouring the composition for base resin part into a hopper to be poured into a chute, and then spraying the composition for pearl stripe part via a nozzle. By using such a nozzle in spraying, gaps, widths and/or patterns of stripes may be freely regulated. Here, using a number of nozzles, patterns may be formed by spraying various kinds of compositions comprising different kinds of pearls having different colors respectively, in various directions.

In addition, although being not particularly limited, it is preferred in the present invention that spraying of said composition for pearl stripe part is performed in an air pressure of 0.2 MPa to 0.6 MPa. If said air pressure is less than 0.2 MPa, it is apprehended that a composition for pearl stripe part is badly sprayed. If it is in excess of 0.6 MPa, it is apprehended that excessive amount of composition for pearl stripe part is sprayed.

In the present process, following forming stripe patterns on the composition for base resin part by the aforementioned method, the artificial marble may be prepared via hardening, tailoring and sanding processes through conventional methods in this field. Particularly, said sanding process is originally carried out to evenly finish surfaces of the artificial marbles, but it can further perform a role to display the pearl stripe that have been included inside on the surface, in case of the present invention, whereby stripes having clearer and more brilliant patterns can be embodied.

MODE FOR THE INVENTION

Hereinafter, the present invention is explained in more detail via examples according to the present invention, but the scope of the present invention is not limited by examples set forth below.

Example 1

(1) Preparation of Composition for Base Resin Part

To 100 parts by weight of acrylic resin syrup comprising 30 parts by weight of poly(methyl methacrylate) and 70 parts by weight of methyl methacrylate, 160 parts by weight of aluminum hydroxide, 0.2 parts by weight of t-butyl peroxyneodecanoate, 0.3 parts by weight of t-amylperoxy 2-ethyl hexanoate, 3 parts by weight of ethylene glycol dimethacrylate, 0.2 parts by weight of n-dodecyl mercaptan as a chain transfer agent, 0.2 parts by weight of BYK 555 (manufactured by BYK-Chemie GmbH, Germany) as a antifoaming agent, 0.75 parts by weight of BYK 900 (manufactured by BYK-Chemie GmbH, Germany) as a coupling agent, 0.2 parts by weight of Hisorp-P (manufactured by LG Chem, Ltd., Korea) as an ultraviolet stabilizer and 2 parts by weight of a black colorant were added. Then the mixture was mixed and degassed to prepare a composition for base resin part. The prepared composition had viscosity of 80 ps, and specific gravity of 1.65.

(2) Preparation of Composition for Pearl Stripe Part

As compositions for pearl stripe part expressing stripes, 3 kinds of compositions, a composition (Composition 1) in which 3 parts by weight of silver pearl was added, a composition (Composition 2) in which 1 parts by weight of silver pearl and 2 parts by weight of gold pearl were added and a composition (Composition 3) in which 2 parts by weight of gold pearl and 1 parts by weight of red pearl were added (Composition 3), to the same composition as prepared for base resin part ((1) of Example 1), were prepared. The viscosity of all three compositions was 65 ps and the specific gravity of all three compositions was 1.66.

(3) Preparation of Pearl Stripe Artificial Marble

The composition for base resin part prepared above were poured into a hopper and then allowed to be poured into a chute. Then, stripes were formed by spraying three kinds of compositions for pearl stripe part in an air pressure of 0.4 MPa via a nozzle, and the composition were hardened in an oven and were subjected to sanding to prepare artificial marbles.

The invention claimed is:
1. An artificial marble comprising
a base resin part; and
a pearl stripe part containing a matrix resin and pearls, and formed in said base resin part for expressing stripes in said base resin part by mean of said pearls contained therein.

2. The artificial marble of claim 1, wherein the base resin part comprises one or more selected from the group consisting of an acrylic resin, an unsaturated polyester resin and an epoxy resin.

3. The artificial marble of claim 1, wherein the base resin part further comprises one or more additives selected from the group consisting of a crosslinking agent, a polymerization initiator, an inorganic filler, chips, a polymerization accelerator, a radical carrier, an antifoaming agent, a coupling agent, a pigment, a dye, an ultraviolet absorbent, a flame retardant, a releasing agent, a polymerization inhibitor and an antioxidant.

4. The artificial marble of claim 1, wherein the pearl stripe part comprises 1 to 10 parts by weight of pearl relative to 100 parts by weight of the matrix resin.

5. The artificial marble of claim 1, wherein the pearl stripe part is included in an amount of not more than 20 parts by weight relative to 100 parts by weight of the base resin.

6. The artificial marble of claim 1, wherein the stripe expressed by the pearl stripe part has width of 10 mm or less.

7. A process for preparing an artificial marble which comprises steps of;
preparing a composition for a base resin part, which comprises one or more base resin selected from the group consisting of an acrylic resin, an unsaturated polyester resin and an epoxy resin;
preparing a composition for a pearl stripe part, which comprises a matrix resin and pearls; and
spraying said composition for the pearl stripe part into the composition for the base resin part by using a nozzle to prepare a composition for an artificial marble.

8. The process of claim 7, further comprising steps of hardening the composition for an artificial marble; and tailoring and sanding the hardened composition.

9. The process of claim 7, wherein the composition for the base resin part has viscosity of 80 to 100 cps, and the composition for the pearl stripe part has viscosity of 60 to 80 cps.

10. The process of claim 7, wherein the composition for the base resin part has specific gravity of 1.4 to 2.0, and the composition for the pearl stripe part has specific gravity of 1.5 to 2.2.

11. The process of claim 7, wherein spraying of the composition for the pearl stripe part is carried out in an air pressure of 0.2 MPa to 0.8 MPa.

\* \* \* \* \*